United States Patent [19]

Jacobsen et al.

[11] Patent Number: 5,457,368

[45] Date of Patent: * Oct. 10, 1995

[54] MECHANICAL/ELECTRICAL DISPLACEMENT TRANSDUCER

[75] Inventors: Stephen C. Jacobsen; Michael G. Mladejovsky; John E. Wood, all of Salt Lake City, Utah

[73] Assignee: University of Utah Research Foundation, Salt Lake City, Utah

[*] Notice: The portion of the term of this patent subsequent to Apr. 12, 2011 has been disclaimed.

[21] Appl. No.: 183,280

[22] Filed: Jan. 18, 1994

Related U.S. Application Data

[62] Division of Ser. No. 28,767, Mar. 9, 1993, Pat. No. 5,302,886.

[51] Int. Cl.$^6$ ............................. G01R 29/12; H04R 19/00
[52] U.S. Cl. .................... 318/568.16; 318/652; 318/687; 200/11 R; 200/61.45 R
[58] Field of Search ..................................... 318/560–646, 318/652; 200/2.6 R, 11 R, 16 R, 11 K, 292, 61.53, 61.45 R, 503

[56] References Cited

U.S. PATENT DOCUMENTS

| | | |
|---|---|---|
| 3,146,320 | 8/1964 | Wang et al. . |
| 3,452,309 | 6/1969 | Wilkes . |
| 3,471,668 | 10/1969 | Wilkes . |
| 3,544,740 | 7/1968 | Robin . |
| 3,546,402 | 4/1969 | Spaeth . |
| 3,567,881 | 12/1969 | Duimstra . |
| 3,688,063 | 2/1971 | Bell . |
| 4,157,462 | 6/1979 | Blanchard . |
| 4,203,015 | 5/1980 | Tuchscherer . |
| 4,220,944 | 9/1980 | Pudelko et al. . |
| 4,230,978 | 10/1980 | Gardella et al. . |
| 4,348,559 | 9/1982 | Chu . |
| 4,380,692 | 4/1983 | Blanchard et al. . |
| 4,405,841 | 9/1983 | Van Zeeland .......................... 200/11 R |
| 4,533,798 | 8/1985 | Yatchum et al. . |
| 4,572,006 | 2/1986 | Wolfendale et al. . |
| 4,649,759 | 3/1987 | Lee . |
| 4,758,693 | 7/1988 | Hoffman .............................. 200/11 R |
| 4,767,973 | 8/1988 | Jacobsen et al. . |
| 4,789,803 | 12/1988 | Jacobsen et al. . |
| 4,879,556 | 11/1989 | Duimel ............................ 200/61.45 R |

OTHER PUBLICATIONS

"Rolamite: A New Mechanical Design Concept", by D. F. Wilkes, Dec. 1967.

*Primary Examiner*—Paul Ip
*Attorney, Agent, or Firm*—Thorpe North & Western

[57] ABSTRACT

Displacement measuring apparatus for measuring the displacement and movement of an object includes a sensor having an operative surface and circuitry for producing an electrical output signal whose value is dependent upon the area of the operative surface covered by an electrical/magnetic field producing member. The apparatus also includes an elongate, flexible band capable of producing an electric/magnetic field, where the band is attached at one end to the sensor to roll over and cover or unroll from over and uncover the operative surface as the object whose displacement is to be measured is moved. The value of the electrical output signal produced by the circuitry is thus dependent upon the area of the operative surface covered by the band and thus by the position and movement of the object.

22 Claims, 7 Drawing Sheets

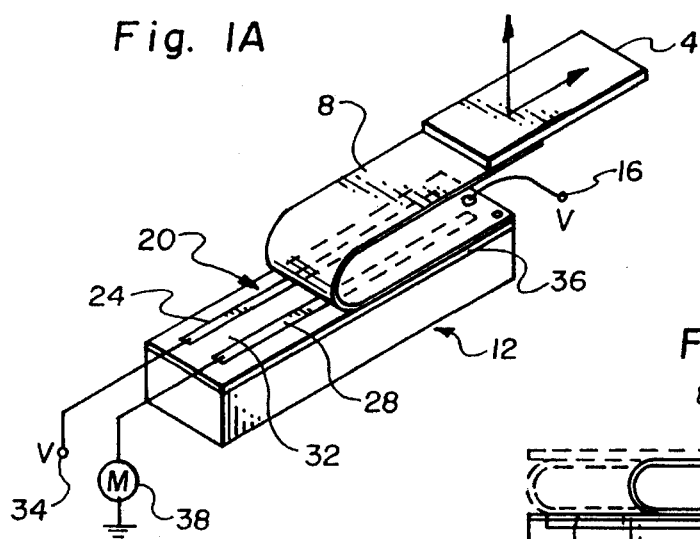
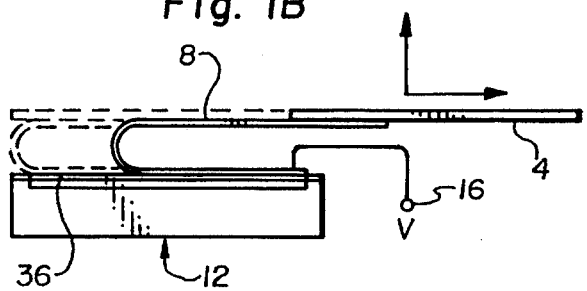
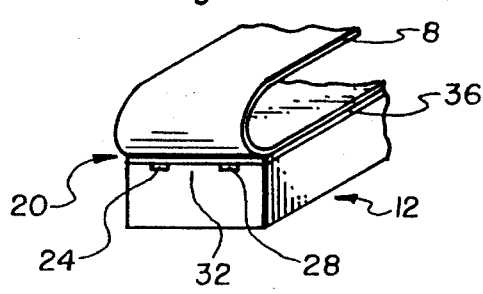
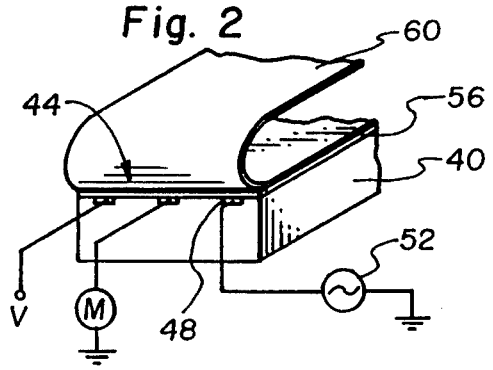
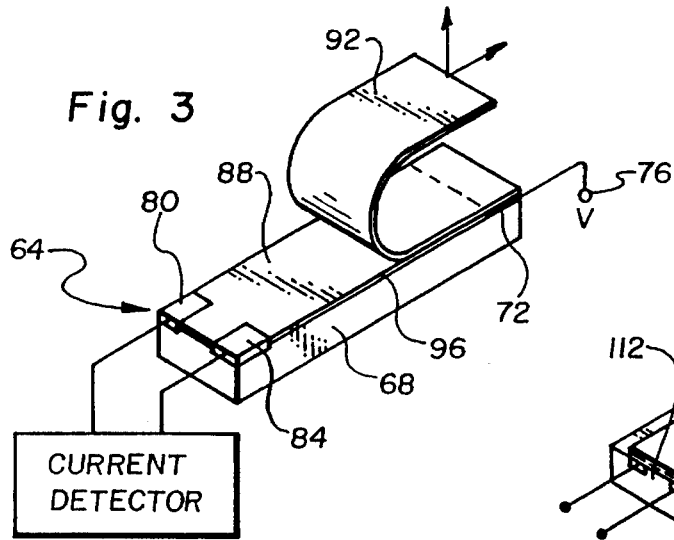
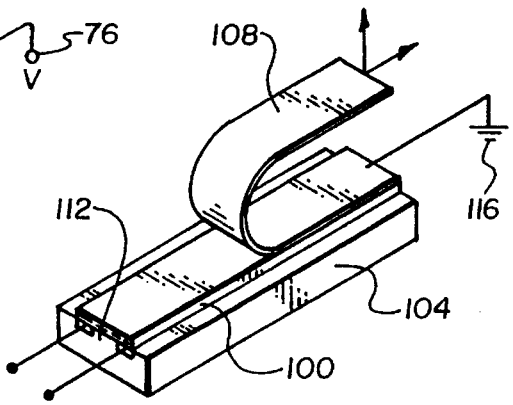

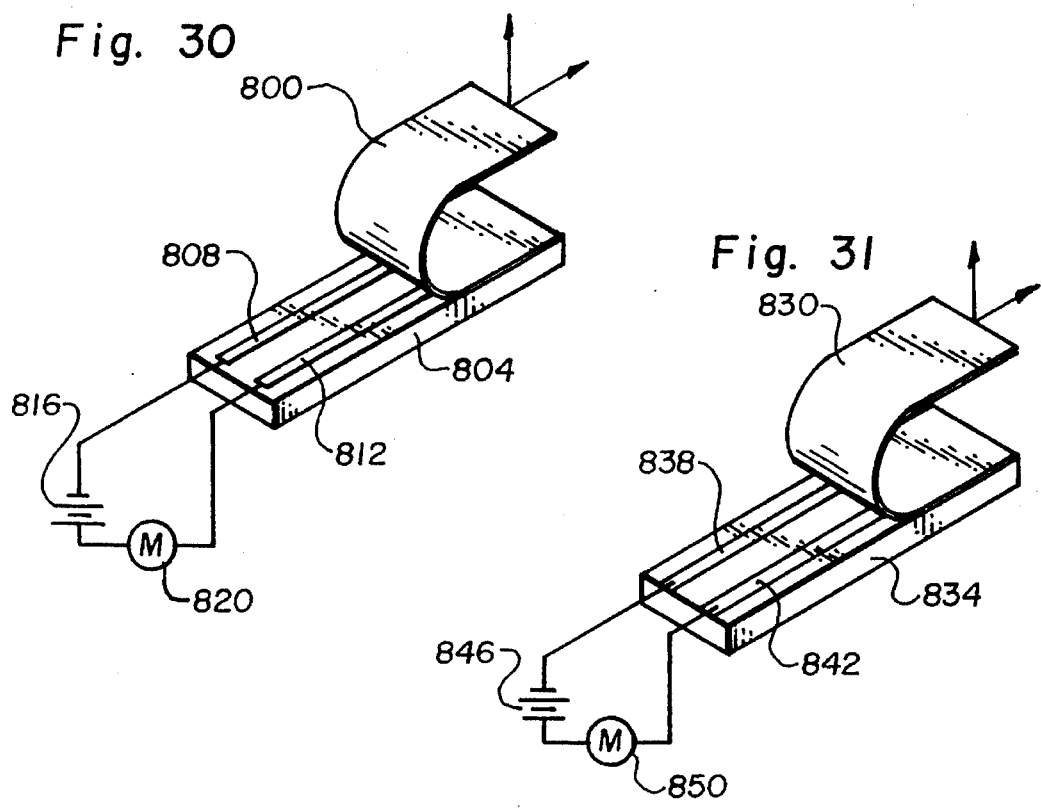
Fig. 30
Fig. 31
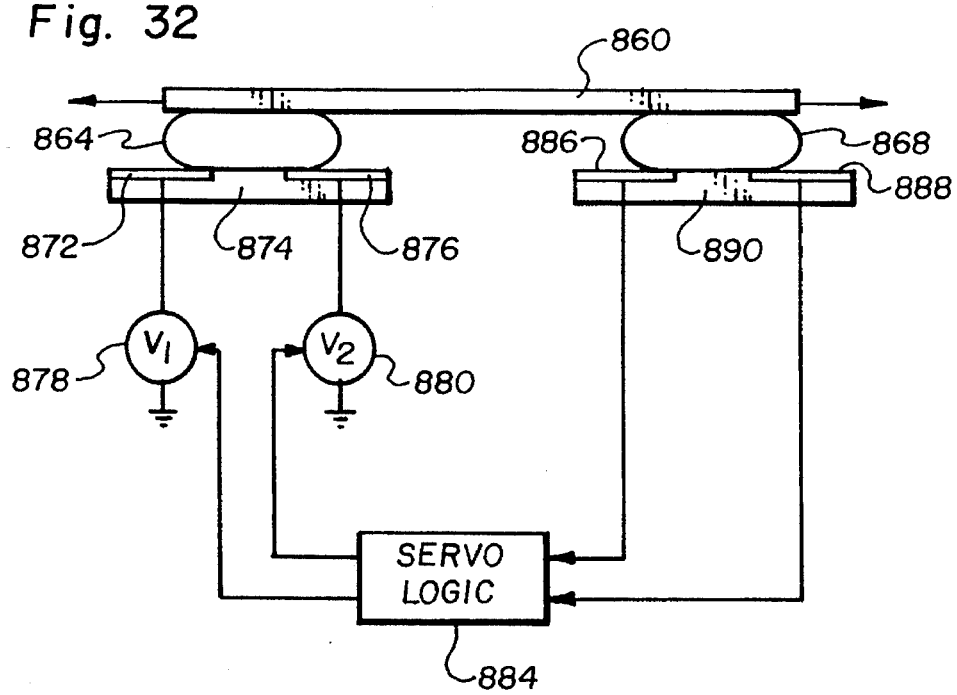
Fig. 32

5,457,368

MECHANICAL/ELECTRICAL DISPLACEMENT TRANSDUCER

This application is a divisional of application Ser. No. 08/028,767 filed Mar. 9, 1993, now U.S. Pat. No. 5,302,886.

BACKGROUND OF THE INVENTION

This invention relates in general to apparatus for sensing displacement or position of an object, and in particular to apparatus which utilizes a flexible moveable band or other moveable element to convert a physical measure of displacement and position of an object into an electrical signal representing such measure.

In the operation of various mechanical and electro-mechanical systems, it is necessary to monitor the position and displacement of either some element of the system or some object which is not part of the system. For example, in robotic systems (a technology whose use is dramatically increasing) it is almost always necessary to monitor and control the movement and position of various component parts of the systems, such as an arm, fingers or other grasping elements, etc. Such monitoring and control yields the dexterity and precision required for a robotic system to carry out its functions.

Prior art mechanisms for sensing position and displacement have most often utilized a direct connection between the article or object whose position or displacement was to be monitored, and some type of gauge, needle or other visual indicator. Movement of the article or object would thus cause a corresponding movement of the gauge or needle. As expected, such mechanisms have typically been large and cumbersome and have lacked precision in carrying out the monitoring function. Further, since some type of sliding action of some part of the measuring mechanism typically was involved, friction was present which, of course, resulted in wear.

Although electronic apparatus for measuring position and displacement has come into greater use in recent years and has at least partially solved the bulkiness and imprecision problems of the prior art mechanisms, such apparatus has been complicated in design and, as a result of such complication, generally lacking in reliability. Also, the contact friction and attendant wear generally remained.

SUMMARY OF THE INVENTION

It is an object of the invention to provide a simple, efficient and reliable apparatus for measuring position and movement of a component or article.

It is another object of the invention to provide such apparatus which is compact and contains few moving parts.

It is a further object of the invention to provide such apparatus which avoids the need for sliding, friction-producing components.

It is also an object of the invention to provide such apparatus which is well-suited for use with semiconductors and integrated circuits.

It is still another object of the invention to provide such apparatus which can be fabricated utilizing conventional integrated circuit fabrication technology for at least part of the apparatus.

The above and other objects of the invention are realized in one specific illustrative embodiment of displacement measuring apparatus adapted for measuring position and movement of an object. The displacement measuring apparatus includes a sensor (or plurality of sensors), formed with at least one surface area, for producing an electrical output signal whose value varies with variation in the proximity of a band element to the surface area, and an elongate, flexible band disposed in proximity with the surface area so that at least a portion of the band is caused to selectively roll over and cover or unroll from over and uncover at least a portion of the surface area when the object is moved. Movement and position of the object, which causes the band to roll over or unroll from over the surface area of the sensor, is thus determined by the electrical signal produced by the sensor (or sensors).

In accordance with one aspect of the invention, some portion of the band is fixed relative to the sensor and some other portion is coupled to the object. Movement of the object toward or away from the surface area of the sensor, or generally parallel therewith, will cause the band to change its location relative to the surface area and this change is detected by the sensor.

In accordance with another aspect of the invention, a voltage is supplied to the band to cause it to produce an electric field and the sensor is comprised of a field-effect transistor for detecting the magnitude of the electric field produced by the band and thus the proximity of the band to the field-effect transistor. Alternatively, the band may be magnetized and the sensor may comprise a split-drain magnetic field-effect transistor for detecting the strength of the magnetic field developed by the band and thus the position of the band relative to the magnetic field-effect transistor. Other sensor configurations, for example utilizing the Hall effect, capacitive sensing, optical sensing and sonar sensing, may also be employed to detect the movement and location of the bands to thus detect the movement and location of the object. In addition, the sensor area of sensitivity may be constructed to allow for producing a signal whose value varies in a predetermined (linear or nonlinear) way with movement of the band.

In accordance with still another aspect of the invention, a displacement measuring device utilizes a magnetized or electrically charged rotatable or linearly moveable element coupled to the object whose position is to be measured, and an array of magnetic field or electric field detectors to detect the position of the element and thus of the object.

BRIEF DESCRIPTION OF THE DRAWINGS

The above and other objects, features and advantages of the invention will become apparent from a consideration of the following detailed description presented in connection with the accompanying drawings in which:

FIGS. 1A, 1B and 1C are perspective, side elevational and fragmented end perspective views respectively of displacement measuring apparatus utilizing a field-effect transistor in accordance with the principles of the present invention;

FIG. 2 is a fragmented end perspective view of displacement measuring apparatus utilizing capacitive coupling in accordance with the present invention;

FIG. 3 is a perspective view of displacement measuring apparatus utilizing a split-drain magnetic field-effect transistor in accordance with the present invention;

FIG. 4 is a perspective view of displacement measuring apparatus utilizing an electret sheet and a field-effect transistor in accordance with the present invention;

FIG. 30 is a perspective view of displacement measuring apparatus utilizing electrical resistance variation to detect movement of an object in accordance with the present invention;

FIG. 31 is a perspective view of another embodiment of displacement measuring apparatus utilizing electrical resistance variation to detect movement of an object; and FIG. 32 is a side, elevational view of displacement measuring apparatus of the present invention utilized for measuring, among other things, acceleration and other force producing phenomena.

DETAILED DESCRIPTION

Figure 5:
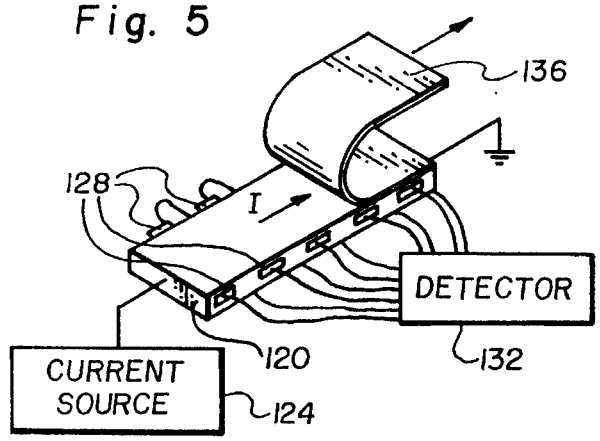
FIG. 5 is a perspective view of displacement measuring apparatus utilizing the Hall effect in accordance with the present invention.

Referring to FIGS. 1A, 1B and 1C, there is shown one illustrative embodiment of a band-controlled transducer or sensor for measuring two degrees of freedom of movement of an object 4. The object 4 (which is simply in the form of a plate in FIGS. 1A through 1C) may take any shape or form and could be a part of a robotic system, or other mechanical structure for which the part's position and movement is to be determined. The object 4 is attached to one end of an elongate, flexible, electrically conductive band 8. The other end of the band 8 is affixed, by a suitable adhesive, pin or other fastening means, to one end of a substrate 12 made, for example, of silicon and having an upper generally planar surface in which are disposed the operating parts of a sensor for sensing the position of the band 8. The band 8 is coupled to a voltage source 16 to enable it to produce an electric field.

Disposed on and formed, for example, by conventional microfabrication techniques on the upper surface of the substrate 12 is a field-effect transistor (FET) 20. The FET 20 is a well-known semiconductor device and includes a conductive source region 24 formed in the substrate 12, a conductive drain region 28 spaced from and formed to be generally parallel with the source region, and a conductive channel region 32 disposed between the source region and drain region. A layer of insulation 36 is disposed over the upper surface of the substrate 12 and over the source, drain and channel regions 24, 28 and 32.

The source region 24 and drain region 28 are maintained at different electric potentials by a voltage source 34 so that electric current is caused to flow between the regions through the channel 32. The conductivity of the channel region 32 is affected by electrical charges (or an electric field) located in close proximity to the channel region. Thus rolling and unrolling the band 8 over the insulation layer 36 to selectively cover and uncover the FET 20 will vary the magnitude of the electrical current being conducted through the channel region 32 and detected by a meter (aremeter) 38. The band 8 effectively acts as the gate of the FET 20 to control the flow of electrical current between the source region 24 and the drain region 28. Measuring this current flow can thus provide a measure of the rolling and unrolling of the band 8 and thus a measure of the position and movement of the object 4. A further discussion of the operation of FETS is found in U.S. Pat. No. 4,767,973, issued Aug. 20, 1988, and incorporated herein by reference.

The band 8 might be constructed of any suitably flexible, electrically conductive material such as copper foil, aluminum foil, metalized polymer film, metalized quartz, metalized thin silicon, etc. Advantageously, the band 8 is formed so that its lateral edges curve downward slightly toward the substrate 12 (when overlaying the substrate) so that the band will roll over and unroll from the insulation layer 12 in a consistent, nonsliding fashion to maintain contact with the insulation layer. Electrostatic attraction can also be used to hold the band 8 snugly against the insulation layer 12.

The band 8 and substrate 12, with component parts, may all be fabricated using microfabrication techniques. The band 8, for example, could be sputter deposited over the substrate 12 and then photolithographically etched to define the desired size and shape. An etchant could also be used to release a portion of the band from the substrate and allow it to cure away from the substrate.

An alternative to utilizing a conductive band 8 connected to a voltage source 16 is to provide a band of material containing positive or negative charges. For example, the band 8 could illustratively be formed from flexible polytetrafluoroethylene with electrons implanted therein.

Another alternative to the FIGS. 1A through 1C embodiment would be to include a layer of conductive material between the layer of insulation 36 and the substrate 12 and then position the FET 20 remotely from the band 8 contact region. This conductive layer or gate would be electrically coupled to the gate of the remote FET so that rolling the band 8 over the insulation layer 36 would induce an electrical charge on the surface of the conductive layer located under the insulation strip 36 and this electrical charge would be reflected in the gate of the remote FET to affect the conductivity of the channel region of the FET. A measure could then be made of the proximity of the band 8 over the insulation layer 36 and thus of the position and movement of the object 4.

FIG. 2 shows an alternative embodiment of a band-controlled displacement measuring device which utilizes capacitive coupling in conjunction with an FET. In this embodiment, a substrate 40 carries the source, channel and drain regions of an FET 44 at the upper surface and near one side of the substrate (similar to the FIG. 1A through 1C embodiment) and a conductive strip of material 48, arranged generally in parallel with the source, drain and channel regions of the FET 44, near the other side of the substrate. Coupled to the conductive strip 48 is an AC electrical voltage source 52. A dielectric layer of material 56 is disposed on the upper surface of the substrate 40 and over the FET 44 and conductive strip 48. A flexible, electrically isolated, conductive band 60 is then disposed to roll over and unroll from over the dielectric layer 56 as an object or component to which the band is coupled is caused to move.

The signal supplied by the voltage source 52 to the conductive strip 48 develops a capacitance between the conductive strip and the band 60 and this capacitance, of course, results in the development of a charge on the band and this charge affects the conductivity of the channel region of the FET 44. As the band 60 is rolled over and unrolled from the dielectric layer 56, the capacitance is caused to change, changing the affect on the FET 44 and the conductivity of the channel region thereof. As with the FIGS. 1A through 1C embodiment, the change in conductivity of the channel region can be monitored as a determination of the movement and position of the band 60 and thus of an object or component coupled to the band.

FIG. 3 shows a perspective view of displacement measuring apparatus utilizing a split-drain magnetic field-effect transistor (MAGFET) 64. The MAGFET 64 is formed on the upper surface of a substrate 68 and includes a source region 72 coupled to a D.C. current source 76, two drain regions 80 and 84, and a conductive channel region 88 disposed between the source region and the two drain regions. A flexible, magnetizable band 92 is disposed on the substrate 68 to selectively cover and uncover the channel region 88. A layer of insulation 96 could, but need not necessarily, be disposed over the MAGFET 64 and under the band 92.

In the absence of a magnetic field impinging upon the channel region 88, current flows from the source region 72 through the channel region 88 equally to the two drain regions 80 and 84. When a magnetic field is present, such as when the magnetized band 92 is an least partially overlying the channel region 88, the current through the channel region is deflected to flow more to one drain region than the other, with the magnitude of the deflection and thus the imbalance of current flowing to the two drain regions being dependent upon the intensity of the magnetic field. This intensity, of course, will depend on what portion of the channel region 88 is covered by the band 92 and so by measuring the current imbalance in the two drain regions 80 and 84, a measure of the displacement of the band and thus of an object to which the band is coupled can be made. The band 92 might illustratively be made of a thin film of alnico alloy (aluminum, nickel, cobalt and sometimes copper), alloy of nickel and cobalt, samarium cobalt, ferric oxide, ferric chromium, chromium dioxide, etc., appropriately magnetized.

FIG. 4 is a perspective view of displacement measuring apparatus which utilizes an electret sheet of material 100 in which are implanted or disposed electrons. The electret sheet 100 is positioned over and attached to a substrate 104 in which is formed an FET 112 in a fashion similar to that described for FIGS. 1A through 1C. Positioned to move over and cover and move from over and uncover the electret sheet 100 is a flexible conductive band 108. The band 108 is attached at one end to the electret sheet 100 and is coupled to a ground potential 116. The other end of the band 108 is joined to an object or element whose position is to be measured.

The device of FIG. 4 operates using a "capacitive divider" effect in which the electric field produced by the electret sheet 100 is directed uniformly outwardly from the sheet when the band 108 is not in close proximity, and is directed towards the band when the band is in close proximity. Thus, the electric field of the electret sheet 100 will be directed towards the FET 112 to affect the conductivity of the channel region thereof when the band 108 is curled away from the sheet, and will be redirected away from the FET 112 and towards the band 108 when the band is in position over the sheet. Thus the conductivity of the channel region of the FET, 112 is determined by the proportion of the electret sheet 112 covered by the band 108. In a manner already described, the device of FIG. 4 could thus be used to measure movement and position of an object.

The electret sheet 100 might illustratively be made of polytetrafluoroethylene, charged with electrons.

FIG. 5 is a perspective view of another embodiment of displacement measuring apparatus where the well-known Hall effect is utilized. The apparatus includes a substrate of conductive material 120, such as copper alloys, aluminum alloys, etc. A current source 124 supplies current to one end of the substrate 120 to flow therethrough to the other end. A series of pairs of electrodes 128 are positioned on opposite sides along the length of the substrate 120 and are coupled to a detector 132. A magnetized, flexible band 136 is attached at one end to one end of the substrate 120 to selectively roll over and unroll from over the substrate as earlier described.

In accordance with the Hall effect, current flowing in a conductor is deflected from one side of the conductor towards the other side when the conductor is subjected to a magnetic field. Thus in the FIG. 5 device, when the magnetized band 136 is overlying a portion of the substrate 120, the current flowing from one end of the substrate to the other is deflected at that portion but is not deflected at the portion which is not overlaid by the band. This current deflection, in the form of a voltage drop, is detected by the detector 132 to provide a measure of that portion of the substrate 120 which is covered by the band 136 and thus a measure of the movement of an object or component to which the free end of the band 136 is coupled.

Figure 6:
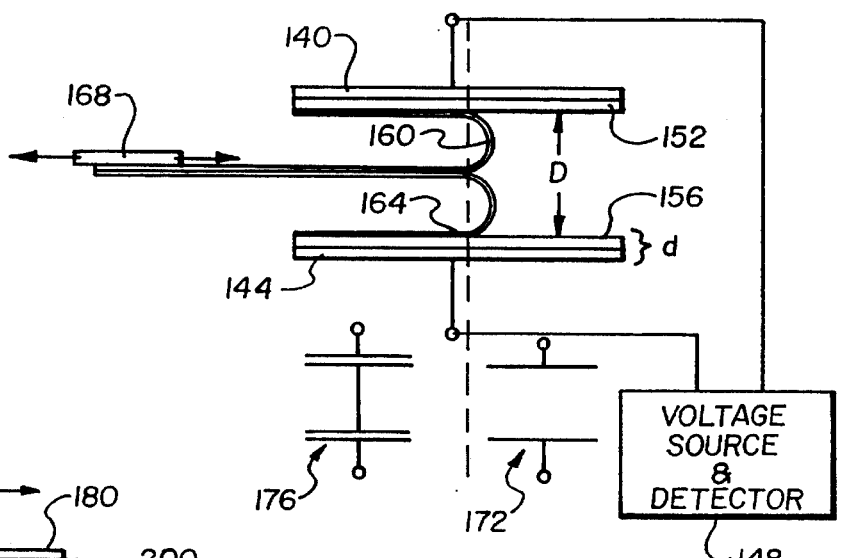
FIG. 6 is a side, elevational view of displacement measuring apparatus utilizing capacitance variation to detect movement of an object in accordance with the present invention.

FIG. 6 is another embodiment of a displacement sensing device made in accordance with the present invention. This device includes a pair of conductive plates 140 and 144 spaced apart a distance D and coupled to a voltage source and detector 148. Two dielectric layers 152 and 156 are disposed on the facing surfaces of plate 140 and 144 respectively as indicated. A pair of elongate, flexible and conductive bands 160 and 164 are each joined at one end to a side of a respective dielectric layer 152 and 156 to extend forwardly along the respective layer and then inwardly and rearwardly where the other ends of the bands are joined together, as shown in FIG. 6. The other ends of the bands 160 and 164 are coupled to an object 168 whose position and movement is to be detected. As the object moves toward a position between the plates 140 and 144, more of the bands 160 and 164 are caused to roll over and overlay dielectric layers 152 and 156 respectively. Of course, as the object 168 moves in a direction away from between the plates 140 and 144, the bands 160 and 164 are unrolled from covering respective dielectric layers. Movement of the object 168 and thus movement of the bands 160 and 164 causes a variation in the capacitance between the plates 140 and 144 which variation is measured by the A.C. voltage source and detector 148, which for example could include an ammeter. The effective configuration of the capacitor plates is graphically illustrated at 172 for the situation where the bands 160 and 164 have been unrolled from between the plates 140 and 144. The effective capacitor configuration for the situation when the bands 160 and 164 are rolled between the plates 140 and 144 is illustrated at 176. The graphic representations 172 and 176 show the effective difference in capacitance for when the bands 160 and 164 are between the plates 140 and 144 versus when the bands are not between the plates. Thus, variation in the capacitance between the plates 140 and 144 provides a measure of the movement and position of the object 168 as desired.

An alternative capacitive measuring device to FIG. 6 involves the use of only one band, for example band 160, and provision of only one conducting plate, for example plate 144, with the other plate, for example plate 140, being nonconductive. Then, the voltage source and detector 148 would still be connected to plate 144, and also band 160 to develop a capacitance between the plate 144 and band 160. This capacitance would vary as the band 160 was rolled over or unrolled from over the nonconductive plate 140, caused by movement of the object 168, to thereby provide a measure of the position and movement of the object.

Figure 7:
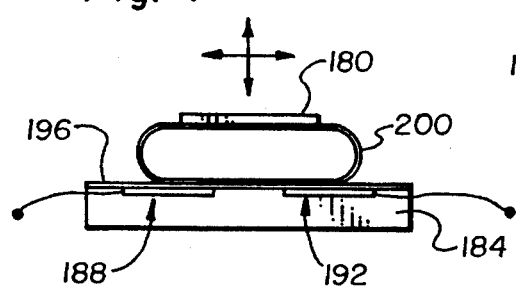
FIG. 7 is a side, elevational view of displacement measuring apparatus utilizing a continuous band for measuring two degrees of freedom movement of an object in accordance with the present invention.

FIG. 7 is a side, elevational view of displacement apparatus utilizing a continuous band to measure two degrees of freedom of movement of an object 180. The apparatus includes a substrate 184 having two FET sensors 188 and 192 linearly spaced apart in the upper surface of the substrate. An insulation layer 196 is positioned on the substrate 184 over the FET sensors 188 and 192. A flexible conductive band 200 is formed into a loop and disposed on the insulation layer 196 to roll back and forth over a locus on which the FET sensors 188 and 192 are disposed.

When the object 180 is moved to the right in FIG. 7, the band 200 is caused to also roll to the right to cover FET sensor 192 and to uncover FET sensor 188. This movement, of course, is detectable by the sensors to provide an indication of both the direction of movement of the object 180 and the magnitude of the movement. If the object 180 is moved upwardly, the band 200 is caused to unroll from both sensors 188 and 192 and this also is detectable. Movement of the object 180 to the left or downwardly can be detected in a similar fashion so that movement to the right or left, and up or down of the object 180 can be readily detected. The band 200, of course, would carry an appropriate charge so as to produce an electric field either from a voltage source or from charges embedded in the band.

Although the FIG. 7 device was described as utilizing FET sensors, it should be understood that other type sensors described earlier could also be utilized such as MAGFETs, capacitive coupling, electret sheets, and Hall effect sensing.

Figure 8:
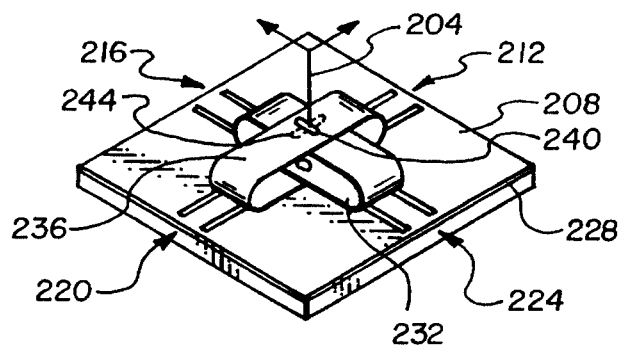
FIG. 8 is a perspective view of displacement measuring apparatus utilizing two continuous bands for measuring movement of a joystick in accordance with the present invention.

FIG. 8 is a perspective view of displacement measuring apparatus for measuring one position and movement of a joystick 204. The apparatus includes a substrate 208 on the surface of which are located four FET sensors 212, 216, 220 and 224, positioned along intersecting imaginary lines as shown. An insulation layer 228 is disposed on the substrate 208 over the four sensors. Disposed on the substrate 208 are two flexible, electrically conductive bands 232 and 236 both formed into loops and disposed crosswise of one another. The joystick 204 is pivotally affixed in the substrate 208 to extend upwardly through openings in the bands 232 and 236, including openings 240 formed in band 236 and opening 244 formed in band 232. To allow movement of the joystick 204 without bending either of the bands 232 and 236 sideways, the openings 240 and 244 are formed crosswise in the respective bands and crosswise with respect to one another as shown in FIG. 8. Thus, the joystick 204 may be moved toward sensor 216 or sensor 224 to thereby move the band 232 without bending the band 236 sideways. Similarly, the joystick may be moved towards sensor 212 or sensor 220 to move band 236 without bending band 232 sideways. Such movement of the joystick 204 and thus of the bands 232 and 236 is detected by the particular sensors affected when the sensors are covered or uncovered as described for earlier embodiments.

Again, the bands 232 and 236 would be charged to produce electric fields as described for earlier embodiments. Also, the bands 232 and 236 might advantageously be secured at lower sections to the substrate 208. Finally, other sensing arrangements described earlier could also be used with the FIG. 8 device.

Figure 9A:
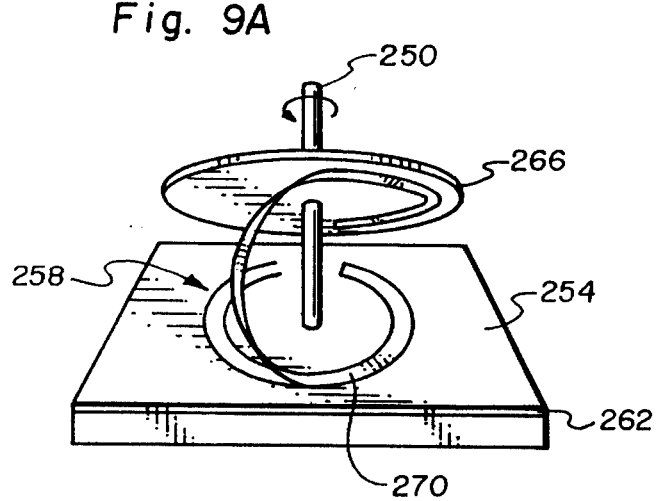
FIGS. 9A and 9B show respectively an isometric view and side, elevational view of rotational displacement measuring apparatus made in accordance with the present invention.
Figure 9B:
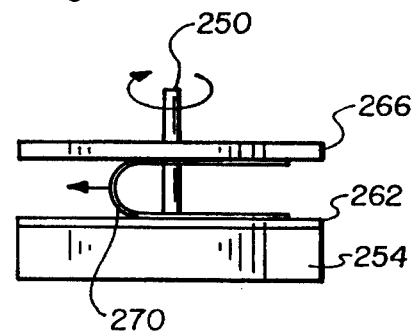

FIGS. 9A and 9B show respectively an isometric view and a side elevational view of apparatus for measuring rotational displacement of a shaft 250. The shaft 250 is mounted to rotate in substrate 254 in which is disposed in an annular configuration an FET sensor 258 having conventional source, drain and channel regions. An insulation layer 262 is positioned on the substrate 254 over the FET sensor 258. A disk 266 is mounted on the shaft 250 above the substrate 254 to rotate as the shaft is rotated. A flexible, electrically conductive band 270 is attached at one end to the insulation layer 262 and at the other end to the bottom of the disk 266 so that when the shaft 250 is rotated in one direction (for example, clockwise looking down on the device), the band is caused to lay down over the sensor 258, and when rotated in the opposite direction, the band is pulled up from over the sensor. Rotational movement and position of the shaft 250 can thus be detected by the sensor 258.

Figure 10A:
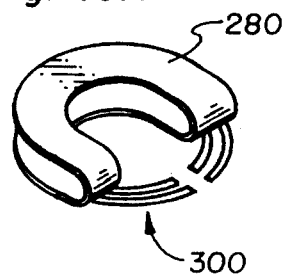
FIGS. 10A an 10B show respectively a perspective view and a side, elevational view of an alternative embodiment of a continuous rotational displacement measuring apparatus made in accordance with the present invention.
Figure 10B:
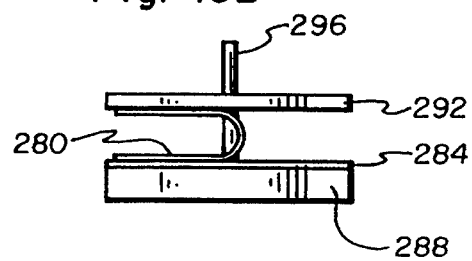

The displacement measuring apparatus shown in FIGS. 10A and 10B utilize a continuously formed band 280 folded over itself to contact both the upper surface of an insulation layer 284 disposed over a substrate 288, and the underneath surface of a disk 292 mounted to rotate with a shaft 296. The shaft 296 is mounted to rotate in the substrate 288. An FET sensor 300 is formed generally in a circle as best seen in FIG. 10A so that as the shaft 296 and thus the disk 292 are rotated, that portion of the band 280 which is in contact with the disk 292 is carried with the disk so that the lower portion of the band progressively covers and uncovers different portions of the sensor 300. The band 280 might illustratively be affixed to the lower surface of the disk 292 although with appropriately fabricated bands, the holding of the band 280 to the underneath surface of the disk could be accomplished by electrostatic attraction, surface tension with a thin film of liquid, magnetization, etc. When the band 280 is not attached either to the disk 292 or the insulation layer 284, it is self-aligning in the radial direction, i.e., it will automatically space itself uniformly about the shaft 296. The device of FIGS. 10A and 10B, of course, provides foe measuring angular position and movement of the shaft 296 as the band 280 is caused to cover and uncover different portions of the sensor 300. Other types of sensors as discussed above could also be utilized in lieu of the FET sensor 300, and in lieu of the FET sensor 258 of FIG. 9A.

Figure 11:
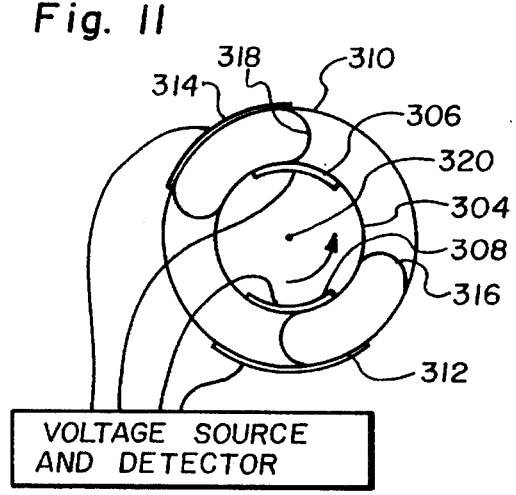
FIG. 11 is a side, elevational view of apparatus for measuring rotational displacement of a cylinder in accordance with the present invention.
Figure 12:
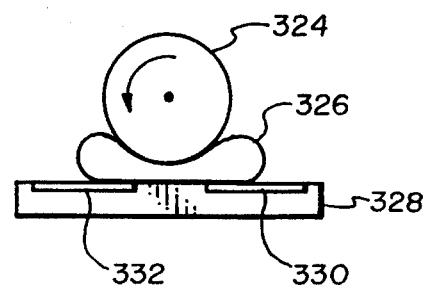
FIG. 12 is a side, elevational view of another embodiment of apparatus for measuring rotational displacement of a cylinder in accordance with the present invention.

FIGS. 11 and 12 show embodiments of apparatus for measuring the angular movement and displacement of cylinders 304 and 324 respectively. The cylinder 304 in FIG. 11 includes conductive plates 306 and 308 formed or attached to the exterior of the cylinder. A hollow cylinder 310 is disposed about the exterior of rotatable cylinder 304, but is spaced therefrom in fixed position. A pair of plates 312 and 314 are carried on the inside surface of the hollow cylinder 310 and spaced apart as shown. Plates 306, 308, 312 and 314 all include a dielectric layer of material on their exposed facing surfaces. Two flexible, electrically conductive bands 316 and 318, formed into loops, are disposed between the cylinder 304 and the cylinder 310 to roll over the interior surface of the cylinder 310 and the exterior surface of the cylinder 304 as the cylinder 304 is rotated about a fixed axis 320. In a manner similar to that described for the FIG. 6 apparatus, the capacitance developed between plates 306 and 314 and plates 308 and 312 varies as the bands 318 and 316 respectively move between or out from between the respective plates so that measuring the capacitance provides a measure of the rotational displacement and movement of the cylinder 304.

Other sensor configurations could also be used in the FIG. 11 structure including FETs, MAGFETs, electret sheets, etc.

In the FIG. 12 embodiment, as the cylinder 324 is rotated about a fixed axis 325, it causes a band 326 formed into a loop to roll back and forth on the surface of a substrate 328 in which is disposed in a linearly spaced-apart relationship two FET sensors 330 and 332. The position of the band 326, detected by the sensors 330 and 332, thus provide an indication of the rotational position of the cylinder 324.

Figure 13:
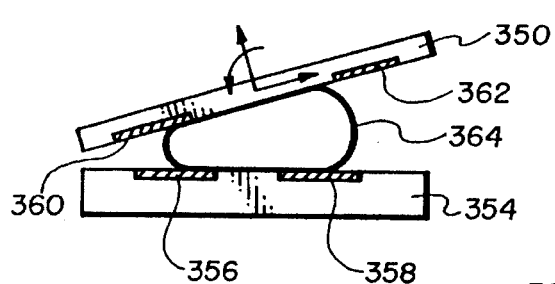
FIG. 13 is a side, elevational view of displacement measuring apparatus for measuring two degrees of freedom of linear movement of an object and another degree of freedom of rotational movement of the object, in accordance with the present invention.

FIG. 13 is a side, elevational view of displacement measuring apparatus for measuring two linear degrees of freedom of movement of a plate 350 and one degree of freedom of rotational movement of the plate. The apparatus includes a substrate 354 in which are object 374.

Figure 15:
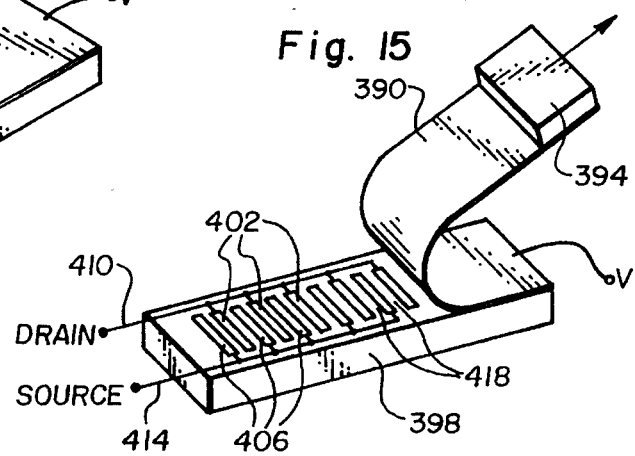
FIG. 15 is a perspective view of displacement apparatus for producing discrete output increments in response to movement of an object, in accordance with the present invention.

FIG. 15 snows a perspective view of apparatus for also producing discrete output increments representing the movement or position of a flexible band 390 and thus of an object 394. Positioned on a substrate 398 are a plurality of drain regions 402 innerleaved with a plurality of source regions 406. The drain regions 402 are connected to a common conductor 410 and the source regions 406 are also connected to a common conductor 414. Disposed between each adjacent drain region and source region are channel regions 418 to effectively define a plurality of FETs arranged in a linear array on the substrate 398. As successive channel regions 418 are covered or uncovered by the band 390, the current flow on conductors 410 and 414 changes to thus provide an indication of the position of the band 390 and thus of the object 394.

Figure 16:
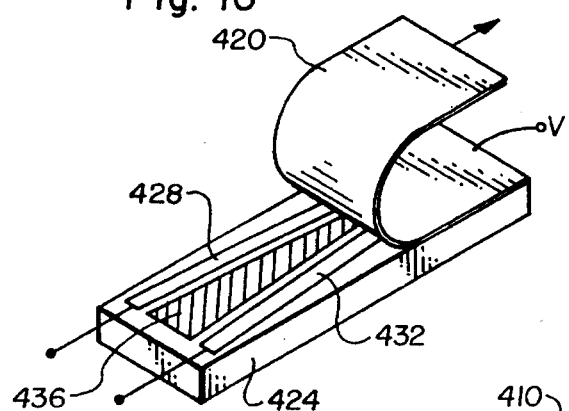
FIG. 16 is a perspective view of displacement measuring apparatus for producing a nonlinear output in response to movement of an object, in accordance with the present invention.

In FIG. 16 is a perspective view of apparatus for producing a nonlinear output in response to movement of a band 420. Disposed on a substrate 424 is a field-effect transistor having a drain region 428, a source region 432 and a channel region 436 disposed therebetween. The channel region 436 varies in width, being widest at the opposite end of the substrate 424 from where the band 420 is attached and gradually tapering inwardly as it runs toward the end of the substrate to which the band is attached. The drain region 428 and source region 432 extend generally parallel with respective sides of the channel region 436 as shown in FIG. 16. When the band 420 is moved to cover the substrate formed on the upper surface thereof two linearly spaced-apart sensors 356 and 358. The plate 350 likewise includes at its lower surface two linearly spaced-apart sensors 360 and 362. A flexible, electrically conductive band 364 formed into a loop is positioned between the plate 350 and substrate 354 to roll back and forth laterally and selectively cover and uncover the sensors 356, 358, 362 and 360 which accordingly produce electrical outputs representing the amount of coverage by the band. This, of course, provides a reading or measure of the location and movement of the plate 350. The sensors 356, 358, 360 and 362 could take a variety of forms as earlier discussed.

Figure 14:
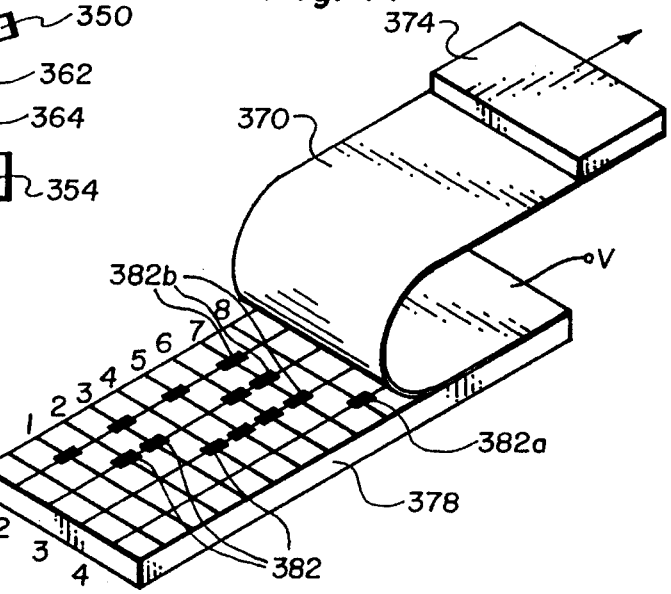
FIG. 14 is a perspective view of displacement measuring apparatus for producing a digital output representing the position and movement of an object, in accordance with the present invention.

FIG. 14 is a perspective view of displacement measuring apparatus for producing a digital output signal representing position of a flexible band 370 and thus of an object 374 to which the band is attached. A substrate 378 includes a plurality of sensors 382 positioned at selected intersections of an imaginary grid on the surface of the substrate so that as the band 370 is rolled over the substrate, different combinations of sensors are affected and these combinations produce binary coded output signals. For example, if only sensor 382 were covered by the band 370, then that sensor would produce an output signal which would represent the numeral 8. If the band 370 were moved to also cover sensors 382b, then they would produce output signals representing the numeral 7, etc. In this fashion, digital output signals are produced to represent different positions of the band 370 over the substrate 378 and thus different positions of the 424, increasingly wider sections of the channel region 436 are covered by the band and so the current change with movement of the band is nonlinear. Of course, the channel region 436 could be formed to taper in the opposite direction to provide a different nonlinear output with movement in the band; various other shapes for the channel region could also be selected to produce nonlinear outputs.

Figure 17:
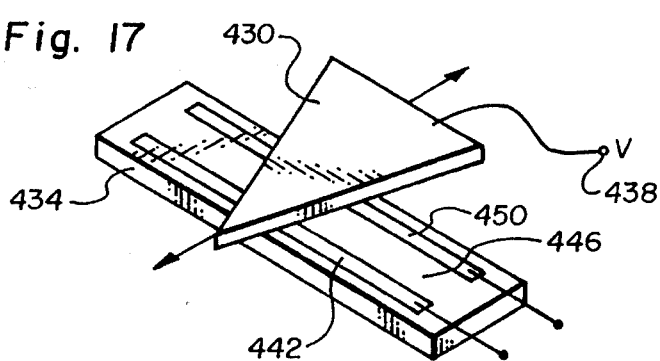
FIG. 17 is a perspective view of displacement measuring apparatus utilizing a linearly moveable, wedge-shaped element.

FIG. 17 shows an embodiment of displacement measuring apparatus which does not utilize a flexible band. Rather, a wedge-shaped, electrically energized plate 430 is employed. The plate 430 is suspended above a substrate 434 (for example, by being attached to an object whose position is to be measured) to move forward or backward in a crosswise direction of the substrate as an object to which the plate would be attached is moved. The plate 430 is coupled to a voltage source 438 to be energized thereby. The substrate 434 includes an FET with a source region 442, channel region 446 and drain region 450. So long as the plate 430 was maintained out of contact with the substrate 434, no insulation layer would be required, although as a precaution it would probably be advisable to include it as an overlay of the substrate.

As can be seen from FIG. 17, as the plate 430 is moved in the direction of the peak of the plate (forwardly), a larger area of the plate covers the channel region 446 of the FET and this, of course, causes a change in conduction between the source region and drain region. As the plate 430 is moved in the opposite direction (rearwardly), less of the plate 430 covers the channel region 446 so that again a change in conduction between the source and drain region occurs. This change in conduction is detectable to determine the position of the plate 430 and thus of the object to which it is connected.

Figure 18:
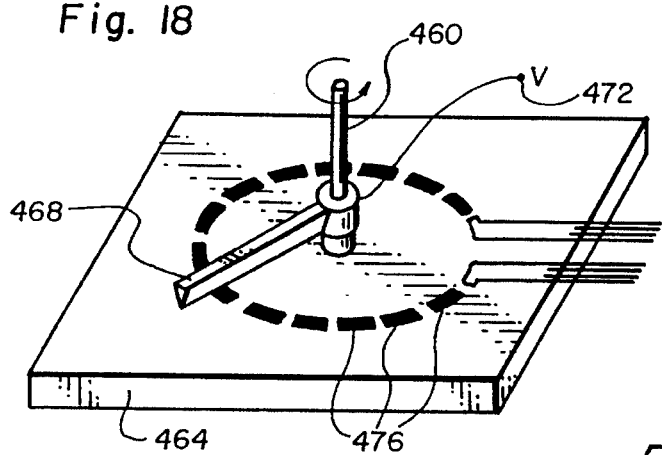
FIG. 18 is a perspective view of another rotational displacement measuring apparatus made in accordance with the present invention.
Figure 19:
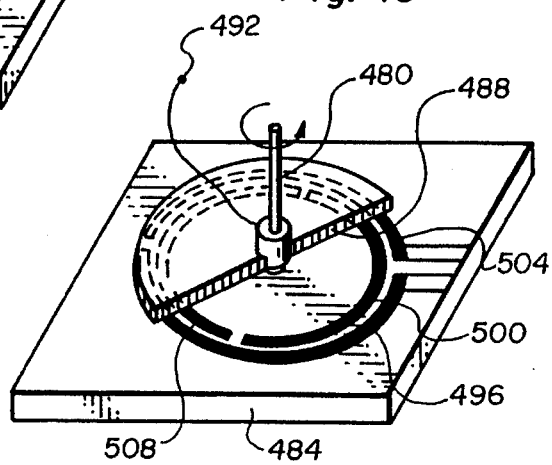
FIG. 19 is a perspective view of still another rotational displacement measuring apparatus made in accordance with the present invention.

FIGS. 18 and 19 are perspective views of other embodiments of rotational displacement measuring apparatus made in accordance with the present invention, but not utilizing flexible bands. The apparatus of FIG., 18 shows an axle or shaft 460 which would be attached to an object whose angular position and displacement was to be measured. The shaft 460 is mounted to rotate about its long axis in a substrate 464. Mounted to extend laterally from the shaft 460 to rotate therewith is an arm 468 having a wedge-shaped cross-section with the apex of the wedge developing a line-charge effect directed downwardly toward the substrate 464. The arm 468 is coupled to a voltage source 472 to receive an electrical charge therefrom. Alternatively, the arm 468 could carry an electrostatic charge for example as a result of electrons being embedded in the arm. Disposed generally in a circle under the path of movement of the arm 468 are a plurality of FET sensors 476.

As the shaft 460 is rotated (because of movement of the object to which it is connected), the arm 468 is caused to sweep over different ones of the sensors 476 which detect the electric field emanating from the arm to thereby generate a signal indicating the position of the arm. Obviously, that sensor 476 producing the strongest signal would be the sensor over which the arm 468 is positioned.

Although the sensors 476 are shown with some spacing therebetween on a substrate 464, the sensors could have a variety of sizes and spacing, with more sensors providing for greater sensitivity in determining angular position of the shaft 460.

FIG. 19 also is adapted for measuring angular displacement of a shaft 480 which is mounted to rotate about its long axis in a substrate 484. Mounted to rotate with the shaft 480 is a semicircular plate 488 to which an electrical charge is supplied by a voltage source 492. The plate 488, like the arm 468, rotates above the top surface of the substrate 484. Formed in the upper surface of the substrate 484 are four FET sensors 496, 500, 504 and 508. Each of the FET sensors is formed in a semicircle (with parallel extending source, drain and channel regions) to be concentric with at least a portion of two of the other sensors. Thus, sensor 496 circumscribes a portion of sensor 500 and a portion of sensor 508 while sensor 504 circumscribes the other parts of sensor 500 and 508. As the plate 488 is rotated, it will always cover portions of at least three of the FET sensors, and in most positions it will cover portions of all four of the sensors.

In operation, the FET sensors 496, 500, 504 and 508 produce signals indicative of the proportion of the sensor affected by the electric field produced by the plate 488 and thus by the portion of the sensor which is covered by the plate. The signals, in turn, define the angular position of the shaft 480 and thus the angular position of the object to which the shaft is connected.

Figure 20:
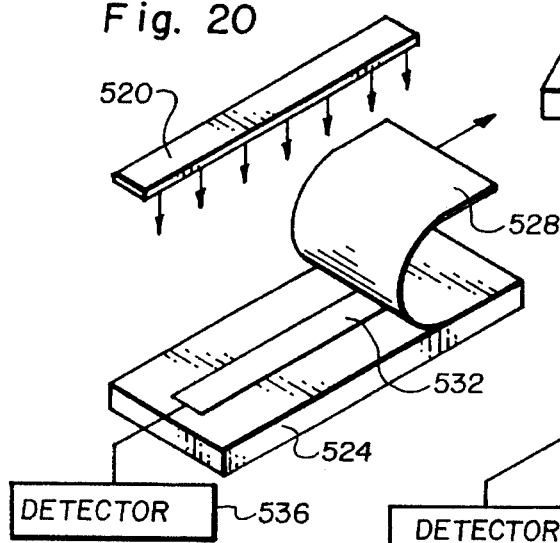
FIG. 20 is a perspective view of displacement measuring apparatus utilizing optical sensing in accordance with the present invention.
Figure 21:
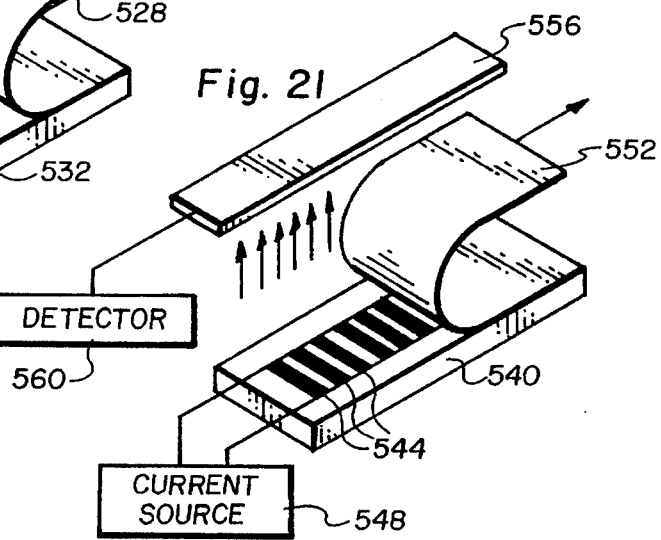
FIG. 21 is a perspective view of another embodiment of displacement measuring apparatus utilizing optical sensing.
Figure 22:
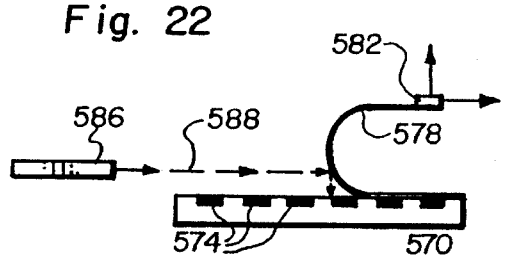
FIG. 22 is a side elevational view of still another displacement measuring apparatus utilizing optical sensing.

FIGS. 20, 21 and 22 all show band-controlled transducers which utilize optical sensing. In FIG. 20, a light source 520 directs light downwardly towards a substrate 524 over the top surface of which an opaque band 528 is disposed to roll and unroll as an object to which the band is connected is moved. Formed in the top surface of the substrate 524 is an elongate photocell 532 which produces an output signal supplied to a detector 536 whose magnitude is proportional to the amount of light impinging on the photocell. As the band 528 rolls to cover and unrolls to uncover the photocell 532, the amount of light blocked by the band, and thus the amount of light impinging upon the photocell 532 varies to thereby cause a variation in the output signal from the photocell. This output signal thus provides a measure of the position of the band 528 over the photocell and thus a measure of the position of the object to which the band is connected.

FIG. 21 shows an alternative embodiment of a displacement measuring device utilizing optical sensing. Here, a substrate 540 includes a plurality of light-emitting diodes 544 formed in the upper surface of the substrate and energized by a current source 548. A flexible, opaque band 552 is attached at one end to one end of the upper surface of the substrate 540 to roll and unroll over the light-emitting diodes 544 as an object to which the band is coupled is moved. Light from the light-emitting diodes 544 is projected upwardly, unless blocked by the band 552, to be detected by a photocell 556. As with the FIG. 20 embodiment, the photocell 556 produces an output signal whose magnitude is proportional to the amount of light impinging thereon and this output signal is detected by a detector 560. Thus, as the band 552 is caused to roll over and unroll from over the substrate 540 and the light-emitting diodes 544, varying amounts of light are allowed to reach the photocell 556 to thereby vary the magnitude of the output signal of the photocell. This output signal thus provides an indication of the position of the band 552 over the substrate 554 and thus a measure of the position of the object to which the band is connected.

FIG. 22 shows a side, elevational view of another embodiment of displacement measuring apparatus utilizing optical sensing. Here, a substrate 570 includes a plurality of photocells 574 disposed on the upper surface thereof. A flexible, light-reflective band 78 is attached at one end to one end of the upper surface of the substrate 570 to roll and unroll from over the upper surface thereof as an object 582, to which the band is attached, is caused to move. A light source 586, for example a laser light source, directs a beam of light 588 toward the band 578 at a location which will reflect the light beamed downwardly towards the upper surface of the substrate 570. The light beam will thus be caused to impinge upon one of the photocells 574 depending upon the position of the band 578 and thus depending upon the position of the object 582. The photocell upon which the light beam is impinging, of course, produces an output signal indicating receipt of the light and such signal is indicative of the position of the band 578 and object 582.

It should be understood that whenever photocells in the embodiments of FIGS. 20 and 21 were shown as being a single photocell, that a series of individual photocells could also be utilized. Also, a series of light-emitting diodes 544 are shown in FIG. 21, but a continuous strip of light could also be utilized.

Figure 23:
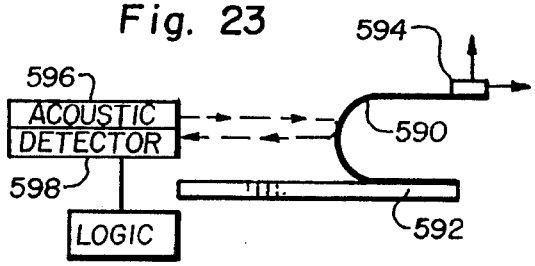
FIG. 23 is a side, elevational view of displacement measuring apparatus utilizing acoustic sensing.

FIG. 23 is a side, elevational view of a band-controlled transducer which utilizes acoustic sensing. Here, a band 590 is connected at one end to a substrate 592 and at the other end to an object 594 whose position and movement is to be measured. Disposed generally at one end of the substrate 592 in the direction in which the band 590 would roll down over the substrate is a sonar signal source 596 for transmitting acoustic signals toward the band 590, and an acoustic detector 598 for detecting signals reflected back from the band. The detector 598 detects the time of travel of the acoustic signals which, of course, varies depending upon the position of the band 590 and thus the position of the object 594. Of course, there is no need for any substrate based detecting elements since the detection of the position of the band 590 is accomplished by the acoustic signal source 596 and detector 598.

Figure 24:
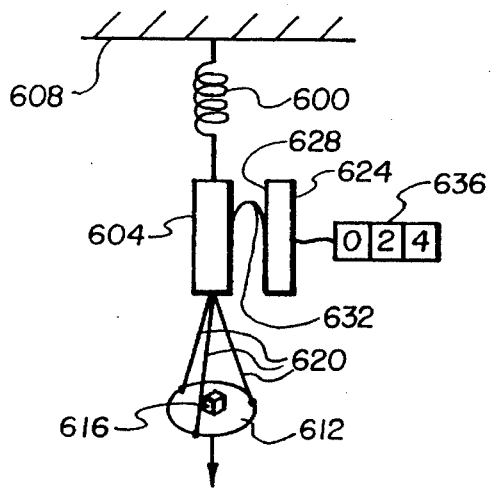
FIG. 24 is a graphic view of displacement measuring apparatus of the present invention utilized for weighing.

FIGS. 24, 25, 26, 27, 28 and 29 all show specific applications of the use of the band-controlled transducers described earlier. FIG. 24 is a graphic view of displacement measuring apparatus of the present invention utilized for weighing. Here, a spring 600 interconnects a moveable element 604 to a fixed support 608. A holding plate 612 for holding an object 616 to be weighed is coupled by connecting lines 620 to the moveable element 604. A substrate 624 includes a sensor formed in the surface 628 over which a flexible band 632 is disposed to roll and unroll, as discussed in the earlier embodiments. One end of the band 632 is attached to the lower end of the substrate 624 and the other end of the band is attached to the moveable element 604 to allow the desired rolling and unrolling of the band. The substrate 624 with sensor 628 is coupled to a display device 636 to provide a reading representing the magnitude of the output signal of the sensor and thus a reading of the weight of the object 616.

Figure 25:
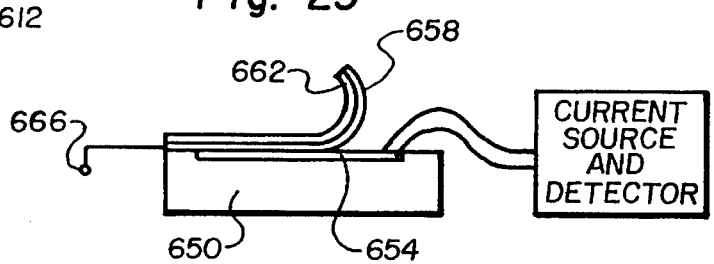
FIG. 25 is a side, elevational view of displacement measuring apparatus of the present invention utilized for temperature measurement.

FIG. 25 is a side, elevational view of temperature measuring apparatus. A substrate 650 includes a sensor 654 formed in the upper surface thereof. A flexible band 658 having a first thermal expansion coefficient is attached at one end to one end of the substrate 650 to overlay a portion of the substrate. A second band 662 having a second thermal expansion coefficient overlays the first-mentioned band 658. A voltage source 666 is coupled to the band 658 to supply a charge thereto.

As the ambient temperature to which the device of FIG. 25 is subjected changes, the bands 658 and 662 are caused to expand at different rates causing the curling or uncurling of the two bands from the surface of the substrate 650. For example, if the thermal expansion coefficient of band 658 is greater than that of band 662, then as the temperature rises, the two bands will tend to curl away from the substrate 650. Of course, as the band 658 rolls over or unrolls from over the sensor 654, the output signals from the sensor vary to indicate the position of the band 658 and thus the ambient temperature.

Figure 26:
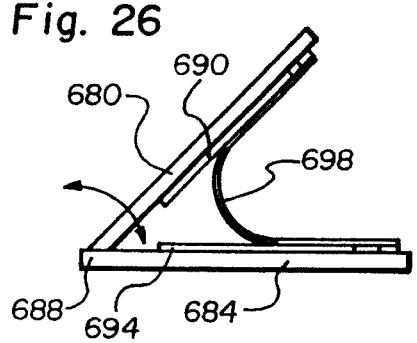
FIG. 26 is a side, elevational view of displacement measuring apparatus of the present invention used for measuring the angle between two elements pivotally joined together at their ends.

FIG. 26 shows a device for measuring the angular position between two elongate elements 680 and 684. The elements 680 and 684 are joined at one end to pivot about a pivot point 688. Linear sensors 690 and 694 are attached to elongate elements 680 and 684 respectively and a flexible, electrically or magnetically energized band 698 is attached at its two ends to elements 680 and 684 so that the band extends inwardly, overlaying a portion of the sensors 690 and 694 in a bow shape. As the elements 680 and 684 are pivoted closer together, more of the band 698 overlays the sensors 690 and 694 and as the elements are pivoted away from one another, less of the band overlays the sensors. The sensors 690 and 694 detect the proximity of the band 698 to produce signals indicating the relative positions of the elements 680 and 684, as discussed for the previous embodiments.

Figure 27:
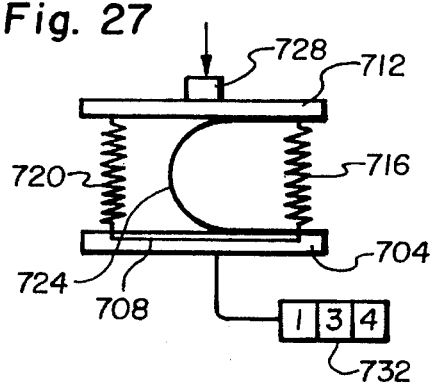
FIG. 27 is a side, elevational view of displacement measuring apparatus of the present invention utilized also for weighing.

FIG. 27 shows an alternative weighing device including a substrate 704 having a sensor 708 formed in the upper surface thereof. A platform 712 is mounted on springs 716 and 720 to maintain a position generally in parallel with and above the substrate 704. A flexible band 724 is connected at one end to one end of the substrate 704 and at the other end to one end of the platform 712. When an object 728 is placed on the platform 712 to be weighed, the platform is caused to move downwardly closer to the substrate 704 to thus cause the band 724 to roll over and cover more of the sensor 708. The weight of the object 728 determines the extent to which the band 724 covers the sensor 708 and this is detected by the sensor to provide a readout in a readout device 732 of the weight of the object.

Figure 28:
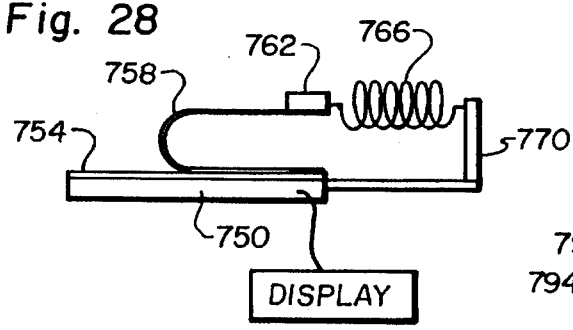
FIG. 28 is a side, elevational view of displacement measuring apparatus of the present invention utilized for measuring acceleration.

FIG. 28 is a side, elevational view of an accelerometer including a substrate 750 having a sensor 754 formed in the upper surface thereof. A band 758 is attached as previously described to the substrate 750 and is attached at the free end to a mass 762. The mass, in turn, is coupled by a spring 766 to a rigid support member 770 which is mounted on the substrate 750. As the device of FIG. 28 is accelerated to the right or left, the mass 762 is caused to move to the left or right respectively depending upon the magnitude of the acceleration (and stiffness of the spring 766) and this movement, in turn, causes the band 758 to roll over or unroll from over the sensor 754 which detects the movement. In this manner, acceleration of the device of FIG. 28 can be measured. The spring 766 restores the mass 762 to a rest position when no acceleration is taking place.

Figure 29:
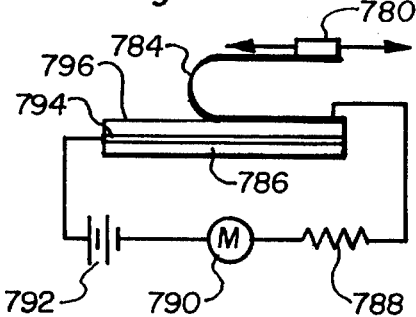
FIG. 29 is a side, elevational view of displacement measuring apparatus of the present invention utilized for measuring velocity.

Finally, FIG. 29 shows a side, elevational view of apparatus for measuring velocity of an object 780. When the object 780 is caused to move left or right at a certain velocity, a band 784 to which the object is attached is caused to roll over or unroll from over a substrate 786 at one-half the velocity of movement of the object. The band is made of a conductive material and is coupled via a resistor 788 and ammeter 790 to a DC current source 792. The other side of the current source 792 is coupled to a conductive plate 794 which is disposed on top of the substrate 786. A dielectric layer 796 overlays the conductive plate 794 and is positioned under the band 784. The current source 792 produces a capacitance between the plate 794 and that portion of the band 784 which is overlying the dielectric layer 796. As the object 780 is caused to move at a certain velocity to the left or right in FIG. 29, the band 784 either covers or uncovers the dielectric layer 796 at one-half that velocity causing a change in the capacitance between the band and the plate 794. This change, which is proportional to the velocity of the object 780, causes a current to flow through the resistor 788 and this current is detected by the ammeter 790 to provide a measure of the velocity of the object 780. Other arrangements for measuring current produced as a result of a change in capacitance could also be provided as discussed earlier.

FIGS. 30 and 31 show perspective views of displacement measuring apparatus utilizing electrical resistance variation to detect position movement of an object attached to the end of a flexible band. In FIG. 30, the band 800 is attached at one end to roll and unroll from over a substrate 804. The free end of the band would be attached to the object (not shown) whose movement was to be detected. Formed in the upper surface of the substrate 804 are two resistive strips of material 808 and 812 which extend generally parallel with one another in a spaced-apart relationship lengthwise on the substrate. The resistive strip 808 is coupled to a current source 816 and the resistive strip 812 is coupled to an aremeter 820 and then to the current source 816. The band 800 is made of a conductive material so that current flows from the current source 816 through that portion of the resistive strip 808 not in contact with the band, through the band to the resistive strip 812 and then through the aremeter 820 back to the current source. The greater the length of the resistive strips 808 and 812 through which current must flow, the lower is the current because the resistance of the flow path is greater, and vice versa. Thus, as the band 800 is caused to roll over or unroll from over the resistive strips 808 and 812, the resistance in the flow path is caused to change, resulting in a variation in the current flowing through the aremeter 820 and this variation is measured to thereby provide a measure of the position of the free end of the band 800. The resistive strips might illustratively be made of nickel-chromium deposited on polymer strips (for example mylar) attached to the upper surface of the substrate 804.

FIG. 31 also measures the position of the free end of the band 830 utilizing electrical resistance variation. Here, the band 830 is attached at one end to a substrate 834 on the upper surface of which are disposed two conductive strips (for example, metal) 838 and 842 arranged to be generally parallel with one another as shown. Conductive strip 838 is coupled to a current source 846 and conductive strip 842 is coupled through an ammeter 850 to the other side of the current source. The band 830 is made of a flexible, resistive material to conduct current between the conductive strips 838 and 842 but to present a predetermined resistivity. A current path is established in the FIG. 31 apparatus from the current source 846 through the conductive strip 838 and across that portion of the band 830 in contact with the two conductive strips to the conductive strip 842 and then through the aremeter 850 back to the current source. As the free end of the band 830 is caused to move, the band rolls over and unrolls from over the conductive strips 838 and 842 to vary the total resistance of the current flow path between the two strips and, as this resistance varies, the current through the ammeter 850 is also caused to vary to thereby provide a measure of the position of the free end of the band 830. The resistive band 830 could illustratively be made of nickel-chromium deposited on a thin polymer sheet of material, of graphite filled rubber, etc.

As described, the FIGS. 30 and 31 apparatus both measure position and displacement of an object connected to a flexible band by utilizing electrical resistance variation in a current flow path.

FIG. 32 shows a side, elevational view of a type of null-band sensor apparatus in which an elongate mass or strip 860 bridges between and is attached to two conductive band loops 864 and 868. The band loop 864 is positioned to bridge between two conductive plates 872 and 876 disposed on a substrate 874. The plates 872 and 876 are connected respectively to voltage sources 878 and 880. The magnitude of the voltage signal supplied by the voltage sources 878 and 880 to respective plates 872 and 876 is controlled by a servologic circuit 884 which receives inputs from sensors 886 and 888 formed in a linear spaced-apart position on the upper surface of substrate 890. The sensors 886 and 888 could be of the types previously described.

In operation, when the mass 860 is caused to move to the left or right in FIG. 32, for example, by a force applied thereto, by acceleration of the FIG. 32 device, etc., the bands 864 and 868 are caused to roll over the respective substrates on which they are disposed and the movement of band 868 is sensed by the sensors 886 and 888 which signal the servologic circuit 884 accordingly. The servologic circuit 884, in response to the signals from the sensors, signals the voltage sources 878 and 880 to produce an electrostatic attraction in a corresponding one of the plates 872 and 876 to attract the conductive band loop 864 and cause it to roll back towards a rest or null position. Thus, if the mass 860 had moved to the left, the plate 876 would be energized to attract the band 864 and cause it to roll back to the null position midway between plates 872 and 876, and vice versa. In the manner described, a null-position acceleration (or other force) sensor is provided.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Displacement measuring apparatus comprising an element whose displacement is to be measured, sensor means including a substrate having a first surface area, an elongate, flexible, electrically conductive band having a first end and a second end, said first end of the band being coupled to said element to move when said element is moved, and said second end of the band being joined to the first surface area so that at least a portion of the band overlies the first surface area, the amount of such portion varying as the first end of said band is moved, and said sensor means further including means, at least a portion of which is disposed at the first surface, for detecting the portion of the band overlying the first surface area and thus the displacement of said element.

2. Apparatus as in claim 1 wherein said sensor means further comprises a conductive strip of material disposed on the first surface and extending under the band, and means for supplying an electrical voltage to said conductive strip, and wherein said detecting means comprises a field-effect transistor having a source region, a drain region, a channel region positioned between the source region and drain region and under the band, and extending generally parallel with the source region and drain region and with the conductive strip, and a dielectric layer overlying the source region, drain region, channel region and conductive strip, said field-effect transistor thereby producing an output signal whose magnitude is proportional to the electric field which impinges upon a portion of the channel region and thus is proportional to the capacitance developed between said strip and said band, such capacitance being proportional to the portion of said band overlying the conductive strip.

3. Apparatus as in claim 1 wherein said sensor means further comprises a conductive strip of material disposed on the first surface and extending under the band, a dielectric layer overlying the conductive strip, and means for supplying an electrical voltage to said band, and wherein said detecting means comprises a field-effect transistor having a gate region coupled to said conductive strip so that the field-effect transistor produces an output signal whose magnitude is proportional to the electric field developed by the band and impinging upon the conductive strip and thus is proportional to the capacitance developed between the band and the conductive strip, such capacitance being proportional to the portion of the band overlying the strip.

4. Apparatus as in claim 1 wherein said substrate is composed of a conductive material, wherein said band is magnetized, wherein said sensor comprises means of supplying an electrical current to the substrate to flow from one end toward the other end, and wherein said detecting means comprises means for detecting the voltage drop from one side to the other side of said substrate at various locations along the substrate underneath the band, said voltage drop varying along the substrate dependent upon the portion of the band overlying the substrate.

5. Apparatus as in claim 1 wherein said sensor means further comprises electret means for producing an electric field and disposed on the first surface and extending under the band, wherein said band is grounded, and wherein said detecting means comprises a field-effect transistor having a source region, a drain region, and a channel region positioned between the source region and drain region under the electret means, said field-effect transducer thereby producing an output signal whose value is proportional to the electric field impinging on the channel region from the electret means which, in turn, is proportional to the area of the electret means not overlaid by the band.

6. Apparatus as in claim 5 wherein said electret means comprises a strip of polytetrafluoroethylene containing electrons and disposed over at least the channel region of the field-effect transistor and under the band.

7. Apparatus as in claim 1 wherein said sensor means further comprises linearly spaced-apart first and second means disposed in the top surface for producing first and second output signals respectively, representing the portions of the first and second means covered by said band, wherein said band is formed into a loop, a lower portion of which is attached to the substrate between the first and second means to allow the band to be selectively flexed to cover and uncover at least portions of said first and second means, and wherein said element is disposed in contact with the upper part of the loop and is moveable toward the substrate to cause the band to cover more of the first and second means, away from the substrate to cause the band to uncover more of the first and second means, sideways in a first direction to cause the band to cover more of the first means and uncover more of the second means, and sideways in a second opposite direction to cause the band to cover more of the second means and uncover more of the first means.

8. Apparatus as in claim 7 wherein said sensor means further comprises means for supplying a voltage to the band to produce an electric field which emanates from the band, and wherein said first and second means comprise field-effect transistors for detecting the magnitude of the electric field impinging on the transistors.

9. Apparatus as in claim 7 wherein said band is magnetized, and wherein said first and second means comprise split-drain magnetic field-effect transistors for detecting the magnitude of the magnetic field impinging on the transistors.

10. Apparatus as in claim 7 wherein said sensor means further comprises means for developing a capacitance between the top surface of the substrate and those portions of the band which overlie the first and second means, and wherein said first and second means comprise field-effect transistors, each for detecting the magnitude of the capacitance between the top surface and that portion of the band overlying said each field-effect transistor.

11. Apparatus as in claim 7 wherein said sensor means further comprises means for supplying a current to said substrate to flow from one end toward the other, wherein said band is magnetized, and wherein said first and second means comprise means for detecting sidewards deflection of the current along those areas of the substrate covered by the band.

12. Apparatus as in claim 7 further comprising a second elongate, flexible, electrically conductive band formed into a loop disposed crosswise of the first-mentioned band, a lower portion of the second band being attached to the lower portion of the first-mentioned band to allow the second band to be selectively flexed laterally of the first-mentioned band, wherein said sensor means further comprises linearly spaced-apart third and fourth means disposed in the top surface on each side of the first-mentioned band and in line with the second band for producing third and fourth output signals respectively, representing the portions of the third and fourth means covered by the second band when flexed to cover the portions of the third and fourth means, and wherein said element is disposed in contact with the upper part of the second band to cause the second band to move when the element is moved.

13. Apparatus as in claim 12 wherein the upper parts of the bands are formed with elongate openings, each of which extends crosswise of the respective band in which it is formed, said openings being located one above the other, and wherein said element comprises a joystick, a lower end of which is pivotally affixed at the lower portions of the bands, and an upper end of which extends through said openings to contact and move the bands as the upper end of the stick is moved.

14. Apparatus as in claim 1 wherein said detecting means is formed generally in a partial circle on the substrate, wherein said element is disposed to rotate above the substrate, and wherein the band is shaped to alternately move and gradually cover the detecting means when the element is rotated in one direction and move and gradually uncover the detecting means when the element is rotated in the opposite direction.

15. Apparatus as in claim 1 wherein said band is formed into a continuous annular loop folded so that one-half of the loop is positioned over the other half, wherein said sensor means further comprises means disposed on the first surface area in a partial circle for detecting the portion of the band overlying the detecting means, and wherein said one half of the band is fixed to said element and said element is disposed to rotate above the substrate to move said one half of the band and thereby cause the other half of the band to move and progressively cover a portion of the detecting means and uncover another portion.

16. Apparatus as in claim 15 wherein said sensor means further comprises means for causing the band to produce an electric or magnetic field which emanates from the band, and wherein said detecting means comprises a semiconductor means for detecting the magnitude of the electric or magnetic field impinging on the semiconductor means.

17. Apparatus as in claim 1 wherein said detecting means comprises a plurality of detecting elements disposed generally in a line on the first surface in the direction of movement of the band, each of said detecting elements including means for producing a signal indicative of the proximity of the band with respect to said each detecting element.

18. Apparatus as in claim 17 wherein said detecting means further comprises additional detecting elements disposed on the first surface, along with said plurality of detecting elements, at selected intersections of an imaginary grid, for producing signals representing digital values indicative of the proximity of the band to the detecting elements.

19. Apparatus as in claim 1 wherein
said sensor means further includes elongate detection means disposed on the first surface area and laid out in a nonlinear locus to produce an output signal whose magnitude varies nonlinearly with movement of said element.

20. Apparatus as in claim 19 wherein said sensor means further comprises means for causing the band to produce an electric or magnetic field which emanates from the band, and wherein said detector means comprises semiconductor means whose latitudinal dimension varies in the semiconductor means longitudinal direction, the magnitude of the output signal produced by the semiconductor means being proportional to the area of the semiconductor means covered by the band.

21. Apparatus as in claim 1 wherein said sensor means further comprises a plurality of individual detecting elements disposed on the surface area generally along a locus in the direction of movement of the band, each of said detecting elements including means for producing a signal indicative of the proximity of the band with respect to said each detecting element.

22. Apparatus as in claim 21 wherein said detecting elements comprise field-effect transistors each having a source region and drain region positioned side by side in the direction of movement of the band, and a channel region located therebetween, each source region of a transistor being adjacent to a drain region of an adjacent transistor, and wherein said sensor means further comprises a first conductor connected to each of the source regions, a second conductor connected to each of the drain regions, and means for supplying current to one of said conductors and for detecting current developed in the other conductor.

* * * * *